(12) United States Patent
Chaillet

(10) Patent No.: US 11,590,581 B2
(45) Date of Patent: Feb. 28, 2023

(54) CUTTING TOOL WITH INTEGRATED LUBRICATION

(71) Applicant: Dixi Polytool SA, Le Locle (CH)

(72) Inventor: Eric Chaillet, Villers-le-lac (FR)

(73) Assignee: DIXI POLYTOOL SA, Le Locle (CH)

( * ) Notice: Subject to any disclaimer, the term of this patent is extended or adjusted under 35 U.S.C. 154(b) by 0 days.

(21) Appl. No.: 17/607,913

(22) PCT Filed: Apr. 16, 2020

(86) PCT No.: PCT/EP2020/060794
§ 371 (c)(1),
(2) Date: Nov. 1, 2021

(87) PCT Pub. No.: WO2020/221603
PCT Pub. Date: Nov. 5, 2020

(65) Prior Publication Data
US 2022/0212267 A1    Jul. 7, 2022

(30) Foreign Application Priority Data

May 2, 2019  (CH) ..................................... 00583/19
May 2, 2019  (CH) ..................................... 00584/19

(51) Int. Cl.
  *B23C 5/28*      (2006.01)
  *B23B 27/10*    (2006.01)

(52) U.S. Cl.
  CPC ..................................... *B23B 27/10* (2013.01)

(58) Field of Classification Search
  CPC ..... B23B 51/06; B23B 51/0684; B23B 27/10; B23C 5/28; B23C 5/286; B23D 77/006
  See application file for complete search history.

(56) References Cited

U.S. PATENT DOCUMENTS

2012/0093592 A1    4/2012  Durst

FOREIGN PATENT DOCUMENTS

CN        107737987 A  *  2/2018
DE      102010002513 A1     9/2010
(Continued)

OTHER PUBLICATIONS

English translation of Written Opinion in PCT/EP2020/060794 dated Jul. 14, 2020, 11 pages.
(Continued)

*Primary Examiner* — Alan Snyder
(74) *Attorney, Agent, or Firm* — Pearne & Gordon LLP

(57) ABSTRACT

A cutting tool for machining mechanical parts. The cutting tool incudes a tool body with a central axis (A) and a gripping diameter. A tool head is adjacent to the tool body in the direction of the central axis (A) and includes of a sprinkling region and a cutting portion having a cutting diameter which is smaller than the gripping diameter. At least one lubrication duct extends through the tool body and opens into a sprinkling hole located in the sprinkling region. A directional sprinkling ring is provided for attachment to a ring connection region of the tool body. The ring connection region is adjacent to the sprinkling region and the directional sprinkling ring is configured in such a way that it delimits, with at least one portion of the sprinkling region, a distribution space, and the cross section of the distribution space is reduced in the direction of the cutting portion.

14 Claims, 8 Drawing Sheets

(56) References Cited

FOREIGN PATENT DOCUMENTS

| DE | 202012103752 U1 | 3/2013 |
| DE | 102013205026 A1 | 9/2014 |
| GB | 1120732 A1 * | 7/1968 |
| JP | 2005014115 A | 1/2005 |
| JP | 2005034976 A | 2/2005 |

OTHER PUBLICATIONS

International Search Report (with translation) in PCT/EP2020/060794 dated Jul. 14, 2020, 8 pages.
Written Opinion in PCT/EP2020/060794 dated Jul. 14, 2020, 6 pages.

* cited by examiner

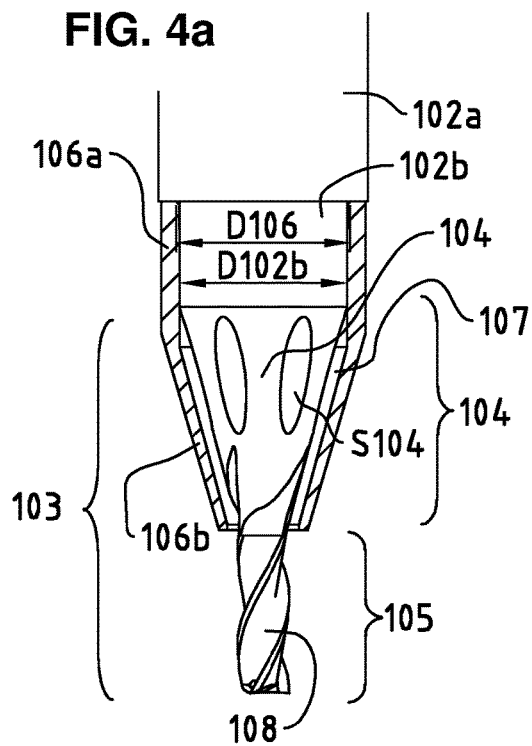
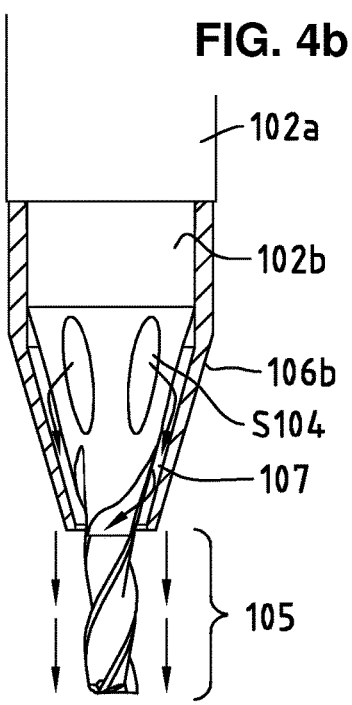
FIG. 4a
FIG. 4b
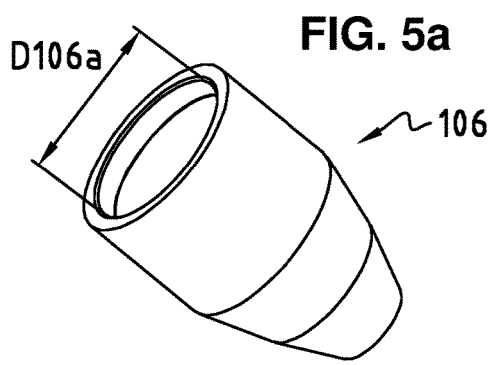
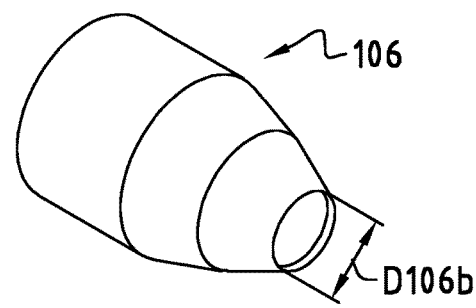
FIG. 5a
FIG. 5b
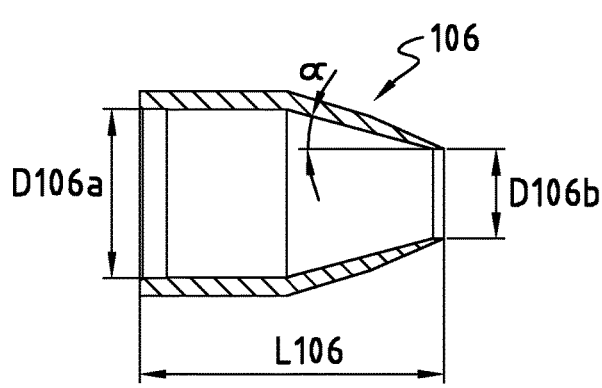
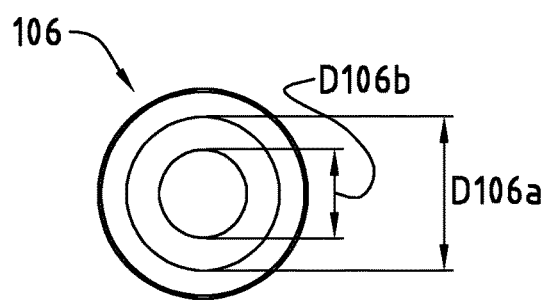
FIG. 5c
FIG. 5d

CUTTING TOOL WITH INTEGRATED LUBRICATION

TECHNICAL FIELD OF THE INVENTION

The present invention relates to the field of tools for machine tools. The present invention relates in particular to the field of cutting tools for machine tools and more specifically to the field of cutting tools with integrated lubrication. The present invention relates, according to a first aspect, more specifically to a cutting tool with integrated lubrication having a directional sprinkling ring making it possible, firstly, to guide the lubricant as close as possible to the cutting portion of the tool and, secondly, to increase the output speed of the lubricant. The present invention relates likewise, according to a second aspect, to a cutting tool with integrated lubrication having a plurality of lubrication ducts extending into the tool body.

STATE OF THE ART

In the field of machining of mechanical parts, it is usual to use cutting fluids or lubricants when machining parts by chip removal. These lubricants make it possible to ensure cooling of the tool; they allow decrease of the friction coefficient, chip removal, the improvement of the surface condition, and an increase in service life of the tools.

Lubricants can be delivered to the cutting edges of tools in many ways. The most common method is to direct the lubricant through one or more pipes located around the cutting area. Thus, at present, the majority of machine tools, of machining methods and of cutting tools use an external sprinkling.

An external sprinkling system has several disadvantages that become particularly annoying in the case of tools of small size. Firstly, an external sprinkling often results in a lack of lubrication and of cooling which leads to an increase of the cutting temperature in the friction zone between the cutting edge of tools, e.g. milling cutters, and the workpiece. This temperature increase diminishes the mechanical properties of the tool material, for example of the tungsten carbide, and drastically reduces the service life of the tools. Secondly, an external sprinkling does not allow an optimal removal of chips which has, as a consequence, that the cutting edges of the tools often intersect the same chips several times. This results in poor surface conditions and even untimely tool breakage. Thirdly, tools of very small size, also called micro-tools, are used in high rotation ranges from 20,000 to 80,000 rpm. At these rotational speeds, the lubricant coming from an external sprinkling only partially reaches the cutting area; it is pushed back by the ring of air rotating around the tool.

Also known from the prior art is to use cutting tools with integrated lubrication which allow the delivery of the lubricant to the cutting area through a single lubrication duct or channel arranged in the tool body along the central axis of the tool. In these known tools, the single lubrication duct opens into the lubrication outlets which are located at the ends of the tools or in the flutes or grooves thereof. The lubrication outlets are formed by drilling into the surface of the tool in a way orthogonal to the central axis of the tool. The orientation of the lubrication outlets thus produced has the effect that the lubricant emanating from these outlets tends to move away from the cutting edges of the tool which results in a non-optimal lubrication. Moreover, at present, tools with integrated lubrication with outlets in the flutes are only known for cutting dimensions larger than 6 mm. Indeed, for tools of less than 6 mm, it is difficult to envisage placing the outlets of the lubrication duct or channels at the end or in the flutes of the tool.

For smaller dimensions, tools that include peripheral sprinkling in the form of straight lubrication ducts or channels parallel to the tool axis are known. In such tools, the outlet holes of the lubrication ducts or channels are placed in an intermediate part of the tool which is located between the tool body and the cutting portion of the latter. Unfortunately, the solution of an integrated lubrication with a peripheral sprinkling is not completely satisfactory. Indeed, the lubricant is not sufficiently directed towards the cutting part of the tool which results in insufficient lubrication. Consequently tools of small dimensions known from the prior art encounter numerous wear and performance problems during machining operations such as grooving, pocket machining, boring or threading by interpolation.

However, tools of small and very small dimensions are frequently used in the manufacture of components for most microsystems. Therefore there exists a need for a cutting tool with integrated lubrication allowing sufficient lubrication of the tool's cutting edges.

SUMMARY OF INVENTION

An object of the present invention is thus to propose a cutting tool with integrated lubrication allowing the aforementioned limitations to be overcome.

According to the invention, these objects are achieved by means of the subject matter of the two independent claims. More specific aspects of the present invention are described in the dependent claims as well as in the description.

More specifically, an object of the invention is attained, according to a first aspect of the present invention, by means of a cutting tool for machining mechanical parts, comprising a tool body with a central axis and a gripping diameter, a tool head adjacent to the tool body in the direction of the central axis and composed of a sprinkling region and a cutting portion having a cutting diameter which is smaller than the gripping diameter, the cutting tool also comprising at least one lubrication duct which extends through the tool body and which opens into a sprinkling hole located in the sprinkling region, characterized in that the cutting tool comprises a directional sprinkling ring that is provided for attachment to a ring connection region of the tool body, the ring connection region being adjacent to the sprinkling region and in that the directional sprinkling ring is configured in such a way that it delimits, with at least one portion of the sprinkling region, a distribution space, and in that the cross section of the distribution space is reduced in the direction of the cutting portion.

By means of a cutting tool according to the first aspect of the present invention, it is possible to direct the lubricant in an optimal way in the direction of the cutting portion of the tool and to achieve perfect lubrication of the tool's cutting edges through the flutes. In addition, with constant lubricant flow, thanks to the directional sprinkling ring and based on the principle of the Venturi effect, the output speed of the lubricant is increased. The increased lubricant velocity promotes continuous, efficient and repeatable chip removal from the cutting zone. The problem of re-cutting stuck chips creating poor surface conditions, frequent with external lubrication processes, is eliminated. Furthermore, the lubricant also mitigates the formation of built-up edges and contributes to a better surface finish of the produced part. In a general way, the service life of the cutting tool is increased.

The advantage of this new sprinkling principle is considerable since tools of small dimensions are widely used in the fabrication of components for most microsystems.

Today, the general miniaturization of many mechanisms and devices in industrial sectors such as medical, watchmaking, electronics, automotive, aerospace are directly concerned by these micro-machining issues.

Another advantage is that it allows reliable and repetitive machining of tools with dimensions of less than 0.30 mm in materials with very difficult machinability such as titanium, high temperature alloys, carbon fibers, etc.

The subject matter of the present invention brings new perspectives to high speed machining. It allows the use of the latest generations of machine tools having very high rotation spindles equipped with internal micro-sprinkling with air and oil and the first carbon dioxide cooling and sprinkling systems.

In a first preferred embodiment of the present invention, the directional sprinkling ring partially covers the cutting portion. This allows the lubricant to be directed and accelerated even more effectively towards the end of the cutting portion of the tool.

In a next preferred embodiment, the tool body comprises 2, 3, 4, 5, 6, 8 or 10 lubrication ducts. This allows the flow of lubricant to be increased and the lubrication of the cutting portion to be improved.

In another preferred embodiment, the lubrication ducts extend through the tool body in parallel with the central axis. This embodiment allows the lubrication ducts to be achieved in a particularly simple way.

In a next preferred embodiment, the lubrication ducts extend through the tool body in a spiral around the central axis.

In a next preferred embodiment, the directional sprinkling ring is removable. This makes it possible for the directional sprinkling ring to be replaced if it is damaged or if another ring with a different shape is more suitable for the specific use of the cutting tool.

In another preferred embodiment, the tool head is a two size milling head, front cut and diameter cut having one to ten cutting teeth.

In another preferred embodiment, the tool head is a thread whirler or a thread milling cutter.

In another preferred embodiment, the tool head is a drill. The technical advantage is to prevent long chips from wrapping around the drill body forcing operators to stop the machining process.

In another preferred embodiment, the tool head is a reamer. The technical advantages are to lubricate the cutting area but also to prevent long chips from wrapping around the reamer body.

In another preferred embodiment, the cutting diameter is smaller than 6 mm, preferably smaller than 5 mm, even more preferably smaller than 4 mm. This allows the production of high precision machined parts.

In another preferred embodiment, the tool head and the tool body are made of tungsten carbide.

In another preferred embodiment, the directional sprinkling ring is made of tungsten carbide, of metal or of synthetic material.

According to a second aspect, the objects of the present invention are attained by means of a cutting tool for machining mechanical parts, comprising a tool body with a central axis and a gripping diameter, a tool head adjacent to the tool body in the direction of the central axis and composed of an intermediate zone and of a cutting portion having a cutting diameter which is smaller than the gripping diameter, the intermediate zone being positioned between the tool body and the cutting portion and having an essentially truncated cone shape, characterized in that the cutting tool comprises at least a first lubrication duct and a second lubrication duct which extend through the tool body, the first lubrication duct opening into a first sprinkling hole and the second lubrication duct opening into a second sprinkling hole, the first sprinkling hole and the second sprinkling hole being located in the cutting portion.

Thanks to such a tool, it is possible to ensure an optimal lubrication even for small or very small cutting tools. The fact that the tool has at least two lubrication channels or ducts makes it possible to ensure that the lubricant reaches the cutting area even if one of the lubrication channels is blocked.

According to a first preferred embodiment of the present invention, the first sprinkling hole and the second sprinkling hole are located inside specific grooves provided at the bottom of the flutes of the cutting portion. The fact that the sprinkling holes are located in the flutes ensures that the lubricant reaches the cutting edges of the cutting portion in an optimal way. This is particularly advantageous for cutting tools whose cutting portion is a milling head.

In a next preferred embodiment, the first sprinkling hole and the second sprinkling hole are located in the front cutting faces of the cutting portion. In this way, the lubricant is supplied directly to the end of the cutting tool and as close as possible to the cutting edges of the front cutting face. This is particularly advantageous when the cutting portion of the cutting tool is a drill bit.

In another preferred embodiment, the first sprinkling hole is located close to a cutting face at the diameter of the cutting portion and the second sprinkling hole is located close to another cutting face at the diameter of the cutting portion. By means of this embodiment, the lubricant is provided both at the end of the cutting portion and on the cutting edges of the diameter cut. This is particularly advantageous for tools that are used in drilling mode but also in milling mode.

In another preferred embodiment, the first lubrication duct and the second lubrication duct extend through the tool body essentially parallel to the central axis. Due to the orientation of the lubrication channels parallel to the central axis, the cutting tool according to the present invention is particularly easy to implement.

In a next preferred embodiment, the first lubrication duct and the second lubrication duct extend through the tool body in a spiral around the central axis. The spiral orientation of the lubrication ducts is particularly advantageous because it allows the lubricant, when it comes out of the lubrication ducts, to be directed onto and along the cutting portion of the tool, and thus makes it possible to prevent the lubricant from moving away from the cutting portion. Moreover the spiral orientation makes it possible to ensure that the lubricant comes out of the sprinkling holes at a sufficient speed to ensure both lubrication and optimal chip removal.

In another preferred embodiment, the helicity of the spiral of the first lubrication duct around the central axis and of the spiral of the second lubrication duct around the central axis is the same as the helicity of the flutes of the cutting portion. This allows the lubrication channels to be oriented in the same way as the flutes of the cutting portion. This is advantageous because the lubricant can thus be supplied to the flutes in an optimal way.

In another preferred embodiment, the pitch of the spiral of the first lubrication duct around the central axis and of the spiral of the second lubrication duct around the central axis is the same as the pitch of the flutes of the cutting portion.

This further ensures that the lubricant is directed into the flutes which allows an optimal lubrication of the cutting tool.

In a next preferred embodiment, the first lubrication duct and the second lubrication duct are oriented in such a way that directly before coming out into the first sprinkling hole, respectively into the second sprinkling hole, the spirals of the lubrication ducts are superimposed on the spirals of the flutes of the cutting portion. This makes it possible to ensure that the lubricant is directed into the flutes and that the vector component of the lubricant velocity corresponds to the direction of the flutes. It is thus possible to reach the maximum speed of the lubricant in the flutes.

In a next preferred embodiment, the tool body comprises a lubrication duct by way of flute of the cutting portion. By the same token, each flute is supplied with lubricant and the cutting portion is lubricated in an optimal way.

In another preferred embodiment, the tool head is a milling head or a boring head.

In a next preferred embodiment, the cutting diameter is smaller than 6 mm, preferably smaller than 5 mm, even more preferably smaller than 4 mm.

In a next preferred embodiment, the tool head and the tool body are made of tungsten carbide.

BRIEF DESCRIPTION OF THE DRAWINGS

The special features and advantages of the present invention will appear with more details in the description which follows with embodiment examples given by way of non-limiting illustration with reference to the attached drawings which represent:

FIG. 4a represents a detailed front view and partial cross section of a cutting tool according to a first embodiment of the first aspect of the present invention;

FIG. 4b represents a detailed front view and partial cross section of a cutting tool according to a first embodiment of the first aspect of the present invention wherein the flow of the lubricant is indicated schematically;

FIG. 5a represents a first perspective view of a directional sprinkling ring;

FIG. 5b represents a second perspective view of a directional sprinkling ring;

FIG. 5c represents a front and cross-sectional view of a directional sprinkling ring;

FIG. 5d represents a rear view of a directional sprinkling ring;

DETAILED DESCRIPTION

Figure 1A:
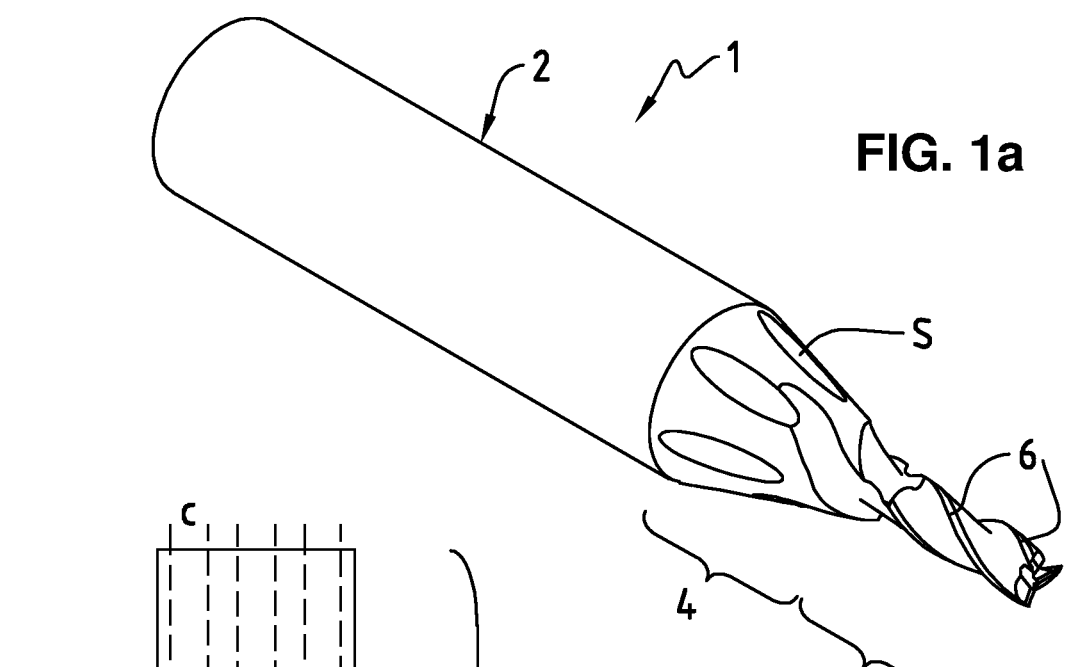
FIG. 1a represents a perspective view of a cutting tool with integrated lubrication known from the prior art.
Figure 1B:
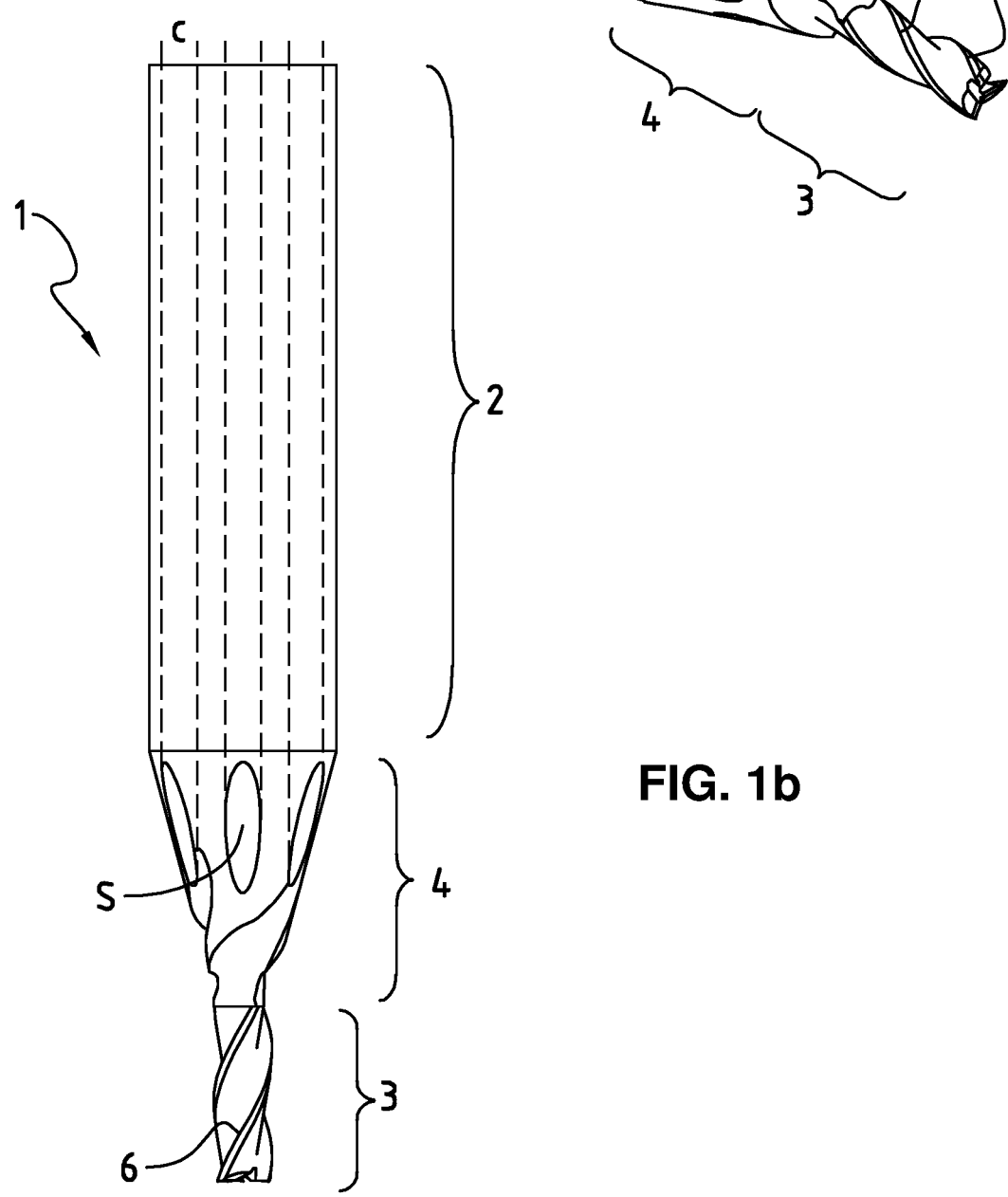
FIG. 1b represents a front view of a cutting tool with integrated lubrication known from the prior art.

FIGS. 1a and 1b show a milling tool 1 with integrated lubrication known from the prior art. The milling tool 1 includes a tool body 2, a cutting portion 3 and between the tool body 2 and the cutting portion 3 an intermediate part 4. The integrated lubrication is guaranteed by means of lubrication channels or ducts C which end in lubrication outlets S. As can be seen, in FIGS. 1a and 1b, the lubrication outlets S are placed in front of the cutting portion 3. Although these tools improve the lubrication of the cutting portion 3 compared with an external sprinkling, the lubricant leaving the lubrication outlets S is only partially directed towards the edges 6 of the cutting portion 3. The effect of the lubricant is therefore only partial and insufficient.

Figure 2:
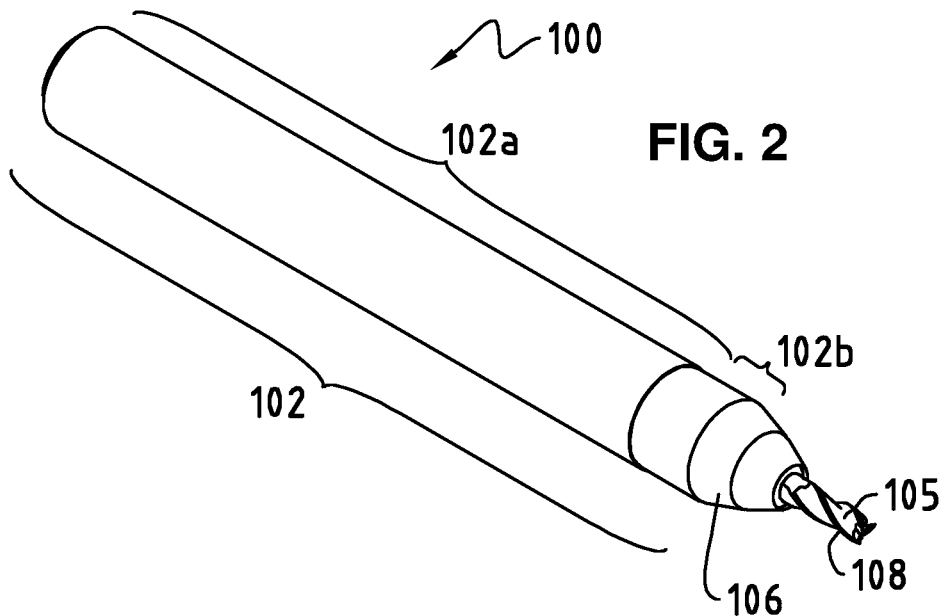
FIG. 2 represents a perspective view of a cutting tool according to a first embodiment of the first aspect of the present invention.
Figure 3:
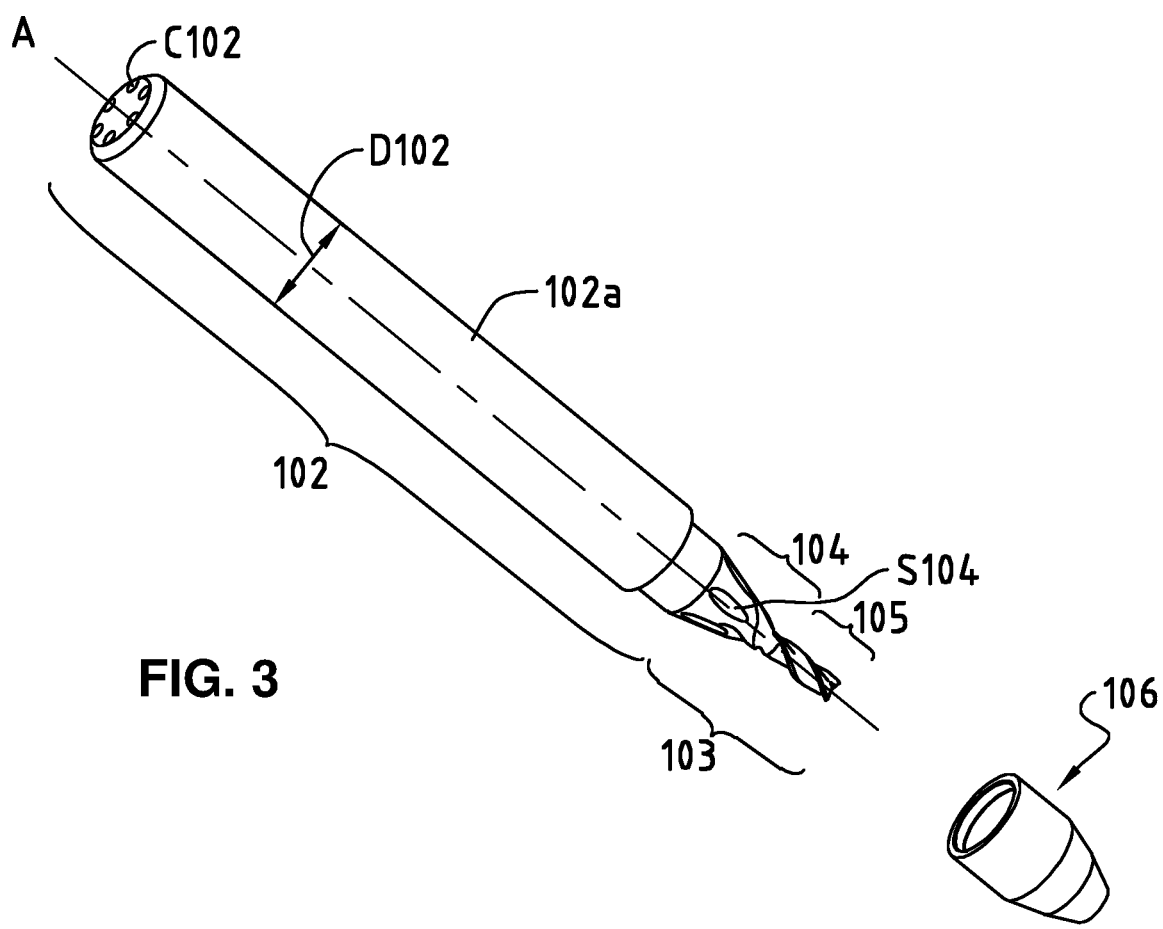
FIG. 3 represents a perspective view of a cutting tool according to a first embodiment of the first aspect of the present invention wherein the directional sprinkling ring has been separated from the tool body.

FIGS. 2 and 3 present a cutting tool 100 with integrated lubrication according to a first embodiment of the first aspect of the present invention. FIG. 2 shows the tool 100 in its "assembled" configuration and ready to use. FIG. 3, for its part, presents the tool 100 in its "disassembled" configuration. As can be understood from FIGS. 2 and 3, the cutting tool 100 with integrated lubrication includes a tool body 102, composed of a gripping part 102a with a gripping diameter D102 and a ring connection region 102b on which the directional sprinkling ring 106 is fixed. The tool body 102 comprises lubrication ducts C102 which extend through the tool body 102, advantageously parallel to or in a spiral around the central axis A, and which open into the sprinkling holes S104. The sprinkling holes S104 are located in the sprinkling region 104 of the tool head 103. The tool head comprises, adjacent to the sprinkling region, a cutting portion 105 with cutting edges 108 that allow the machining of a mechanical part. As can be understood from FIG. 3, the directional sprinkling ring 106 is designed in such a way that it can be mounted and dismounted from the tool body 102.

The usefulness of the directional sprinkling ring 106 will now be illustrated by means of FIGS. 4a and 4b which show detailed views of the cutting tool 100 in the region of the tool head 103. In these figures, the directional sprinkling ring 106 is shown in section to expose the sprinkling holes S104. The directional sprinkling ring 106 is composed of two portions, a cylindrical portion 106a and a conical portion 106b. The cylindrical portion has an inner diameter D106a which corresponds to the diameter D102b of the ring connection region 102b of the tool body 102. In this fashion, the cylindrical portion 106a and the ring connection region 102b form a substantially leak-tight connection which makes it possible to ensure that the lubricant emanating from the sprinkling outlets S104 can only escape with great difficulty in the direction of the tool body 102. The lubricant is thus directed in the direction of the cutting portion 105. In addition, as can be seen in FIGS. 4a and 4b, the conical portion 106b of the directional sprinkling ring 106 is designed in such a way that it delimits with the sprinkling region 104 a distribution space 107. Owing to the conical shapes of the sprinkling region 104 and of the conical portion 106b of the directional sprinkling ring 106, the cross section of the distribution space 107 decreases in the direction of the cutting portion 105. At a constant lubricant flow rate, the lubricant is, due to the Venturi effect, accelerated in the distribution space 107 towards the cutting portion 105.

Thus, when the tool 100 is used, the lubricant flows through the tool in two stages. First, it passes through the channels C102 of the tool body 102 and ends up in the sprinkling holes S104. Then, it passes through the distribution space 107 between the directional sprinkling ring 106 and the sprinkling region 104 in order to then come out at the end of the directional sprinkling ring 106 inside the flutes and as close as possible to the cutting edges 108 of the tool, as indicated schematically by the arrows in FIG. 4b. Thanks to the directional sprinkling ring 106, it is thus possible to achieve lubrication directly on the cutting edges 108 of the tool through the flutes. The preferably circular shape of the outlet of the directional sprinkling ring 106 creates a complete lubrication ring to reach all the cutting edges 108 of the tool as close as possible to the active part and at the same time. In addition, at a constant flow rate of lubricant, thanks to the directional sprinkling ring 107 and the principle of the Venturi effect, the output speed of the lubricant is increased. The increased lubricant velocity promotes continuous, efficient and repeatable removal from the cutting area. The problem of trapped chips creating poor surface finishes, common with external lubrication processes, is eliminated. On the other hand, the lubricant also mitigates the formation of burrs and contributes to a better surface finish of the produced part. In general, this increases the service life of the cutting tool 100.

FIGS. 5a to 5d present different views of a directional sprinkling ring 106. It is important to note that the dimensions and the exact shape of the directional ring 106 can be adapted to the specific tool body 102 on which this ring must be fixed and to the use of the cutting tool 100. For example, the diameter D106a is selected in such a way that it corresponds to the diameter D102b of the ring connection region 102b. In a more important way, the length L106, the outlet diameter D106b as well as the opening angle α of the conical portion 160b of the ring 106 can be adapted to the shape and to the type of tool head 103 as well as to the use of the tool 100. One advantage of the tool 100 according to the present invention thus lies in the fact that the directional ring 106 can be exchanged, as shown in FIG. 3, to accommodate the use of the tool 100.

Figure 6A:
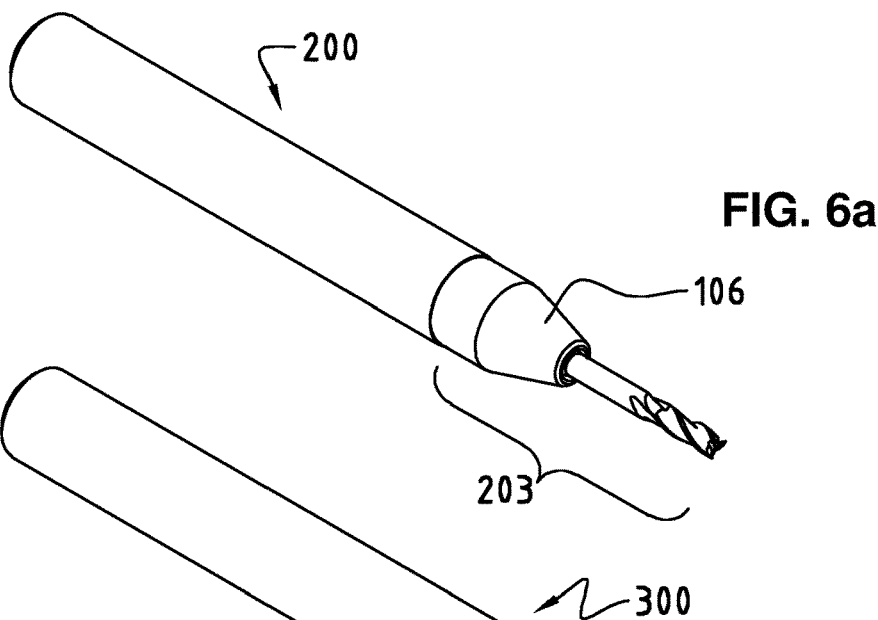
FIG. 6a represents a perspective view of a cutting tool according to a second embodiment of the first aspect of the present invention.
Figure 6B:
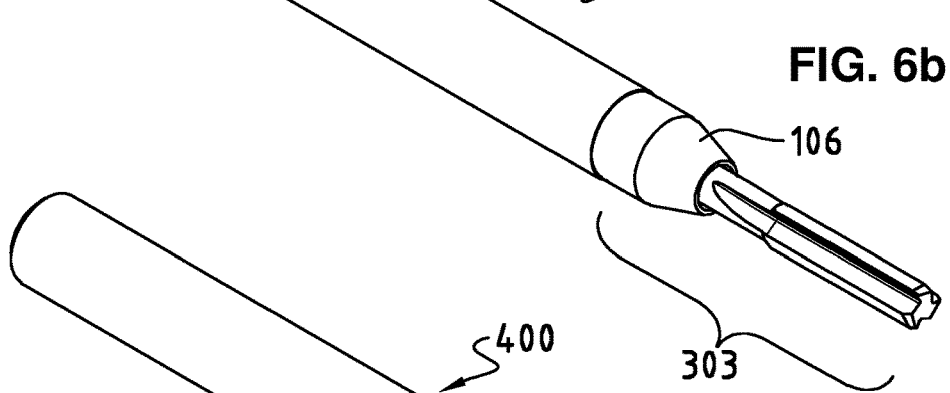
FIG. 6b represents a perspective view of a cutting tool according to a third embodiment of the first aspect of the present invention.
Figure 6C:
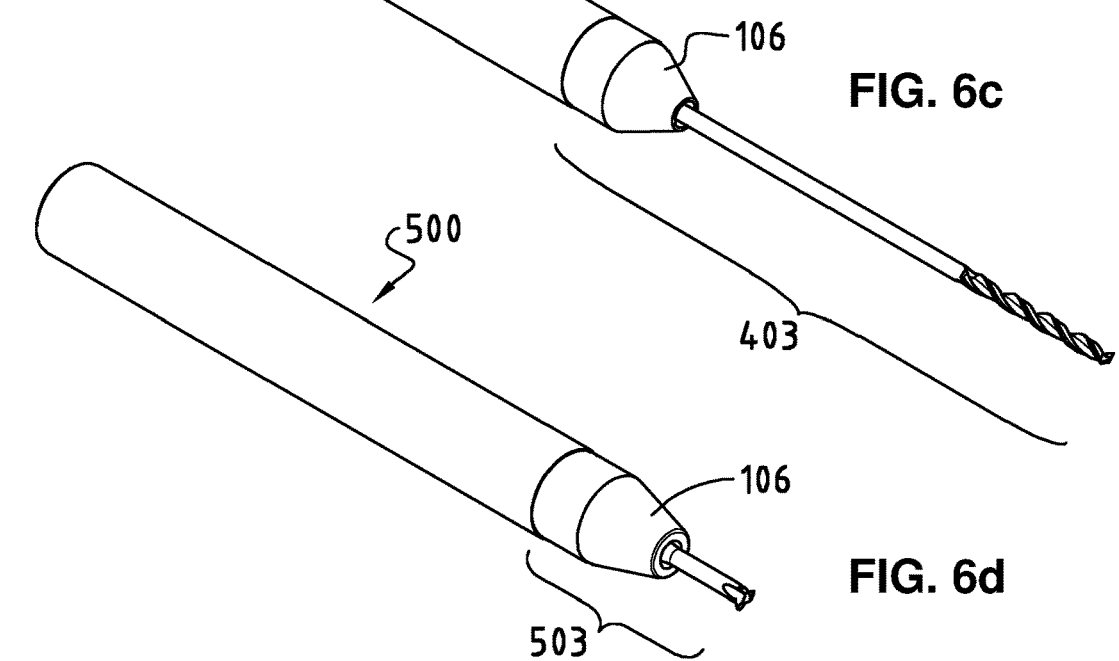
FIG. 6c represents a perspective view of a cutting tool according to a fourth embodiment of the first aspect of the present invention.
Figure 6D:
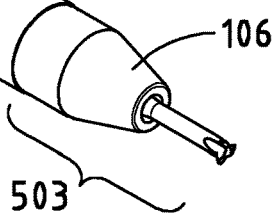
FIG. 6d represents a perspective view of a cutting tool according to a fifth embodiment of the first aspect of the present invention.

Furthermore, the present invention is not limited to tools comprising a tool head 103 in the form of a milling head as shown in FIGS. 1 to 4, but it concerns any type of cutting tool. FIG. 6a illustrates a cutting tool 200 according to a second embodiment of the first aspect of the present invention, wherein the cutting head 203 of the tool 200 comprises a two-size and three-tooth milling cutter with a cylindrical part at the back. FIG. 6b presents a cutting tool 300 according to a third embodiment of the first aspect of the present invention wherein the cutting head 303 is a reamer for through holes. FIG. 6c presents a cutting tool 400 according to a fourth embodiment of the first aspect of the present invention wherein the cutting head 403 is a deep hole drill. FIG. 6d presents a cutting tool 500 according to a fifth embodiment of the first aspect of the present invention wherein the cutting head 503 is a thread whirler. In all the embodiments, the directional sprinkling ring 106 makes it possible to achieve an improved lubrication compared with similar tools that would not include such a ring.

Figure 7A:
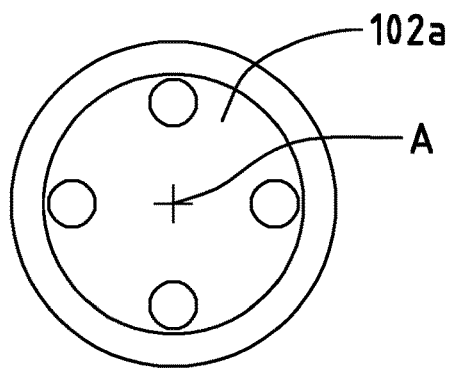
FIG. 7a presents a rear view of a tool according to the first aspect of the present invention comprising four lubrication ducts.
Figure 7B:
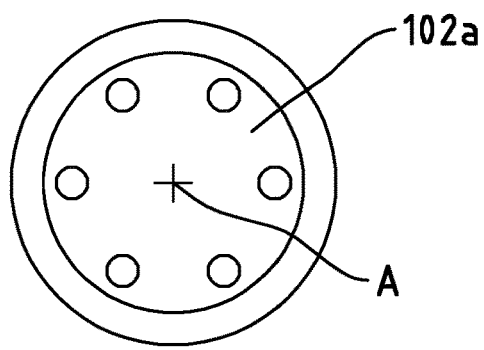
FIG. 7b presents a rear view of a tool according to the first aspect of the present invention comprising six lubrication ducts with circular inlet cross section.
Figure 7C:
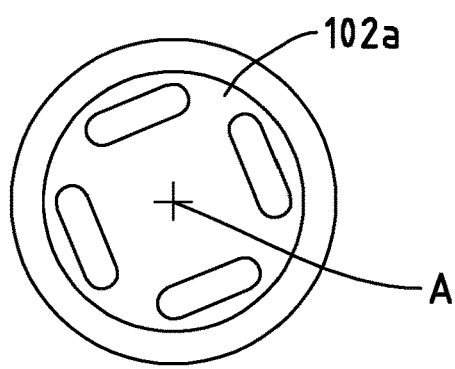
FIG. 7c presents a rear view of a tool according to the first aspect of the present invention comprising ducts with oblong cross section.
Figure 7D:
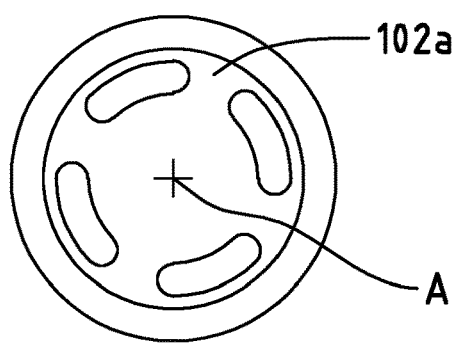
FIG. 7d presents a rear view of a tool according to the first aspect of the present invention comprising ducts with curved oblong cross section.

In order to achieve the desired lubricant effect for the specific application in which the tools 100, 200, 300, 400, 500 are used, the shape and the number of lubrication ducts C102 can be different. FIG. 7a presents a tool according to the first aspect of the present invention comprising four lubrication ducts C102 with a circular cross section. FIG. 7b illustrates a tool comprising six lubrication ducts C102 with a circular cross section. FIG. 7c presents a tool having lubrication ducts C102 with an oblong cross section. FIG. 7d presents, for its part, a tool have lubrication ducts C102 with a curved oblong cross section. Of course, a person skilled in the art will readily understand that other shapes of cross sections as well as a different number of lubrication ducts C102 is possible within the scope of the present invention. Of course, it is also possible to combine lubrication ducts with different shaped cross sections. In FIGS. 7a to 7d, the cross sections of the lubrication ducts C102 are placed at equidistance from the central axis A and are distributed around the central axis A. A person skilled in the art will obviously understand that within the scope of the present invention another distribution of the cross sections of the lubrication ducts C102 is quite possible. Moreover, as mentioned above, the lubrication ducts C102 extend through the tool body 102 preferably parallel to the central axis A or in a spiral around this axis. Of course the ducts C102 can extend in a different fashion through the tool body 102.

Figure 8A:
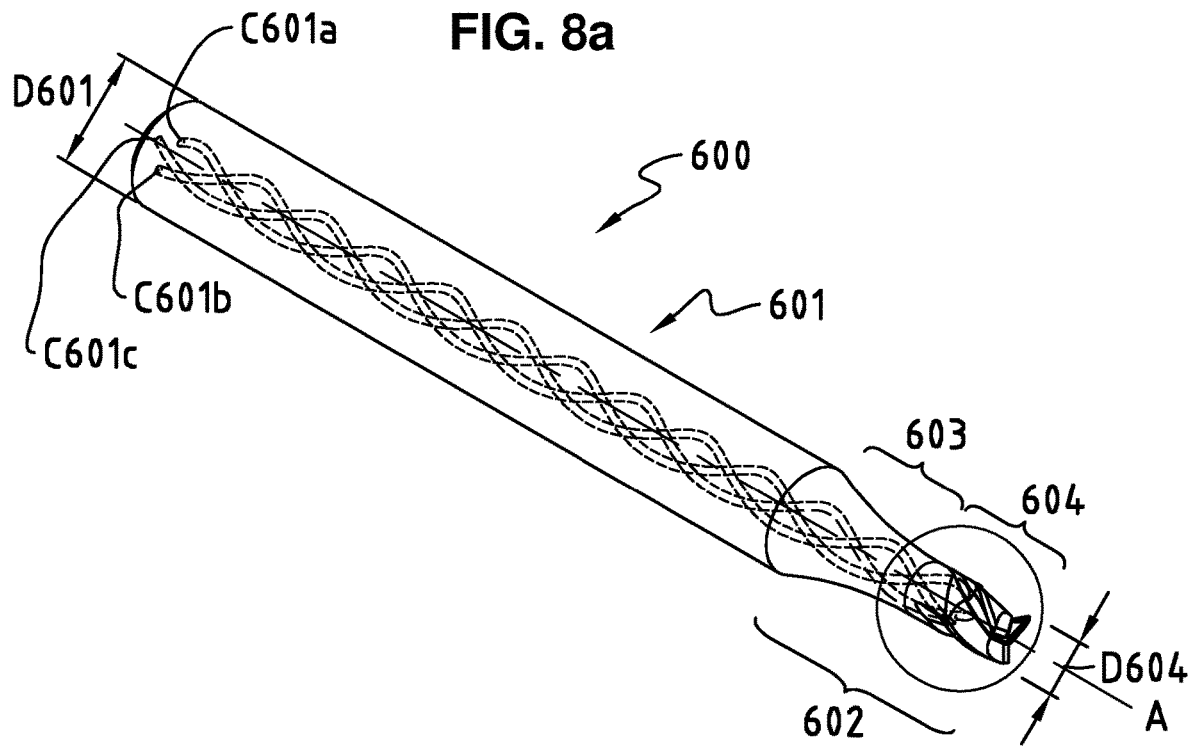
FIG. 8a represents a perspective view of a cutting tool with integrated lubrication according to a first embodiment of the second aspect of the present invention.

FIG. 8a presents a cutting tool 600 with integrated lubrication according to a first embodiment of the second aspect of the present invention. The cutting tool 600 includes a tool body 601 with a gripping diameter D601 as well as a tool head 602. The tool head 602 includes a cutting portion 604, with a cutting diameter D604, which is connected to tool body 601 by means of an intermediate part 603. As can be seen, the intermediate part 603 has an essentially truncated cone shape which makes it possible to reduce the diameter of the tool in the direction of the cutting portion 604 from the gripping diameter D601 towards the cutting diameter D604.

The tool comprises in addition a first lubrication duct C601a, a second lubrication duct C601b as well as a third lubrication duct C601c which extend through the tool body 601 up to the tool head 602. The first lubrication duct C601a comes out into a first sprinkling hole S604a, the second lubrication duct C601b into a second sprinkling hole S604b and the third lubrication duct C601c into a third sprinkling hole S604c.

As can be seen in FIG. 8a, in this embodiment of the second aspect of the present invention, the lubrication ducts C601a, C601b, C601c extend as spiral around the central axis A of the tool body. Advantageously, the helicity of this spiral corresponds to the helicity of the flutes 605 of the cutting portion 604. In addition, it is advantageous if the pitch of the spiral corresponds to the pitch of the spiral formed by the flutes 605.

Figure 8B:
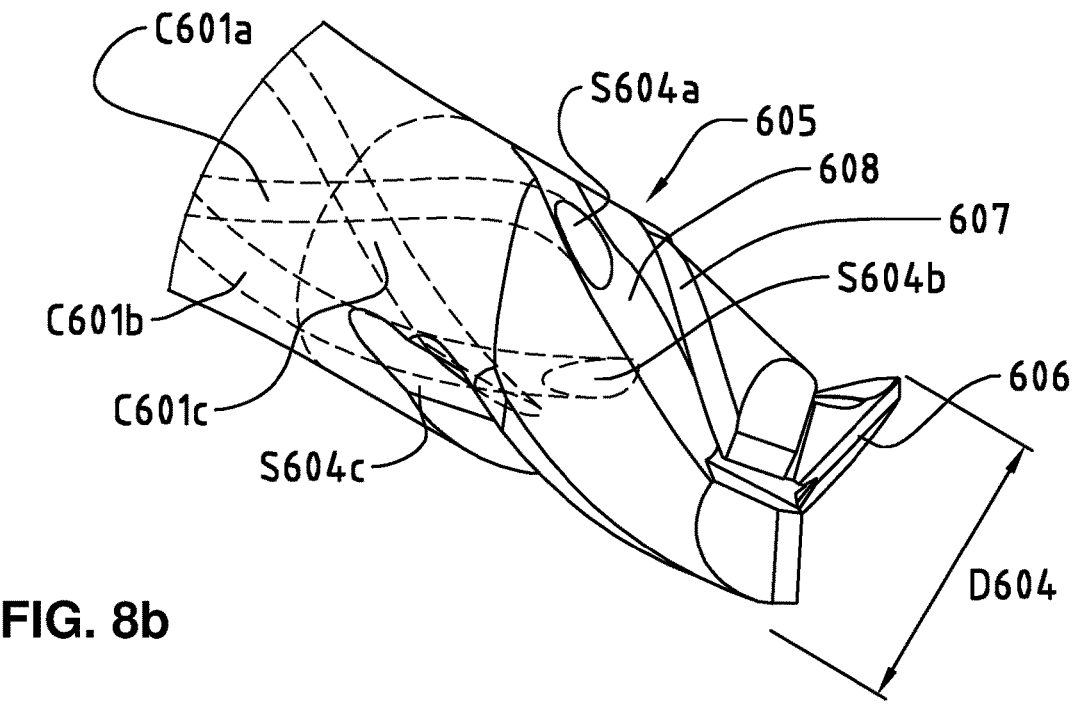
FIG. 8b represents a detailed view of the cutting portion of the cutting tool according to the first embodiment of the second aspect of the present invention.

As illustrated in FIG. 8b, which is a detailed view of the cutting portion 604 of the tool 600 presented in FIG. 8a, the sprinkling holes S604a, S604b, S604c are each located inside a specific groove 608 provided at the bottom of the flutes 605 of the cutting portion 604. The helicity, the pitch as well as the diameter of the spiral of the lubrication ducts are preferably selected in such a way that the flutes 105 <sic. 605> represent the prolongation of the lubrication ducts C601a, C601b, C601c. This is particularly advantageous because the section of sprinkling holes S601a, S601b, S601c are thus oriented in such a way that the lubricant exiting from these holes is directed in an optimal way into the flutes 605 and along the edges 607. Preferably, the sprinkling holes are placed in the flutes as close as possible to the intermediate part 603. This makes it possible to ensure an optimal lubrication along all of the cutting portion 604. This is particularly beneficial when the cutting tool is a milling head.

Figure 9A:
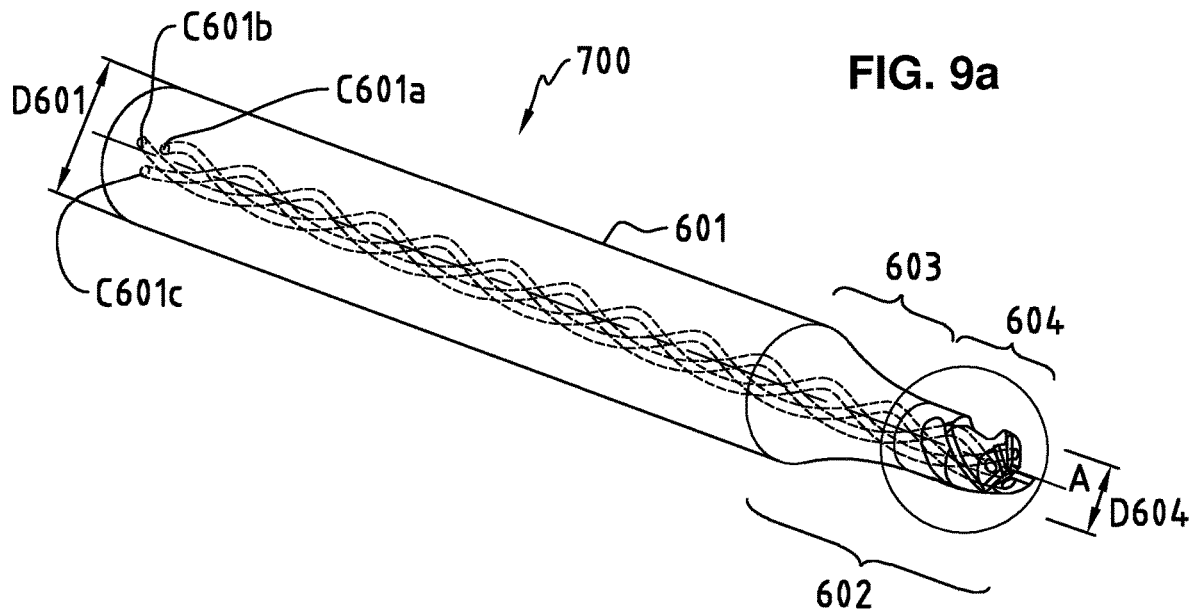
FIG. 9a represents a perspective view of a cutting tool with integrated lubrication according to a second embodiment of the second aspect of implementation of the present invention.
Figure 9B:
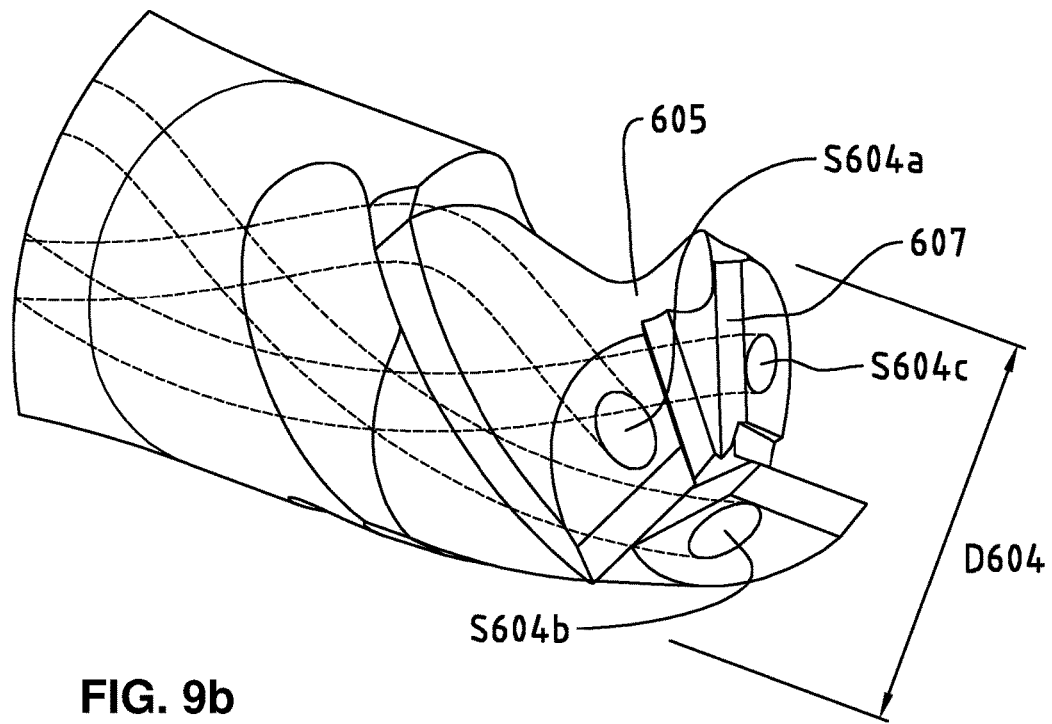
FIG. 9b represents a detailed view of the cutting portion of the cutting tool according to the second embodiment of the second aspect of the present invention.

FIGS. 9a and 9b present a cutting tool 700 with integrated lubrication according to a second embodiment of the second aspect of the present invention. The tool 700 is similar to the tool 600 except for the position of the sprinkling holes S604a, S604b, S604c which are, in this second embodiment, located in the front cutting faces 606 of the cutting portion 604. In the tool 700, the helicity, the pitch as well as the diameter of the spiral of the lubrication ducts are preferably selected in such a way that the lubrication ducts C601a, C601b, C601c open perpendicularly to the front cutting faces 606, as illustrated in FIG. 9b. The lubricant is thus directed from the sprinkling holes in the most advantageous direction. Indeed, the lubricant is thus directed in the direction of the edges of the opposite front cutting faces which enables an optimal lubrication of these edges during surfacing operations as well as for deep pocket machining.

Figure 10A:
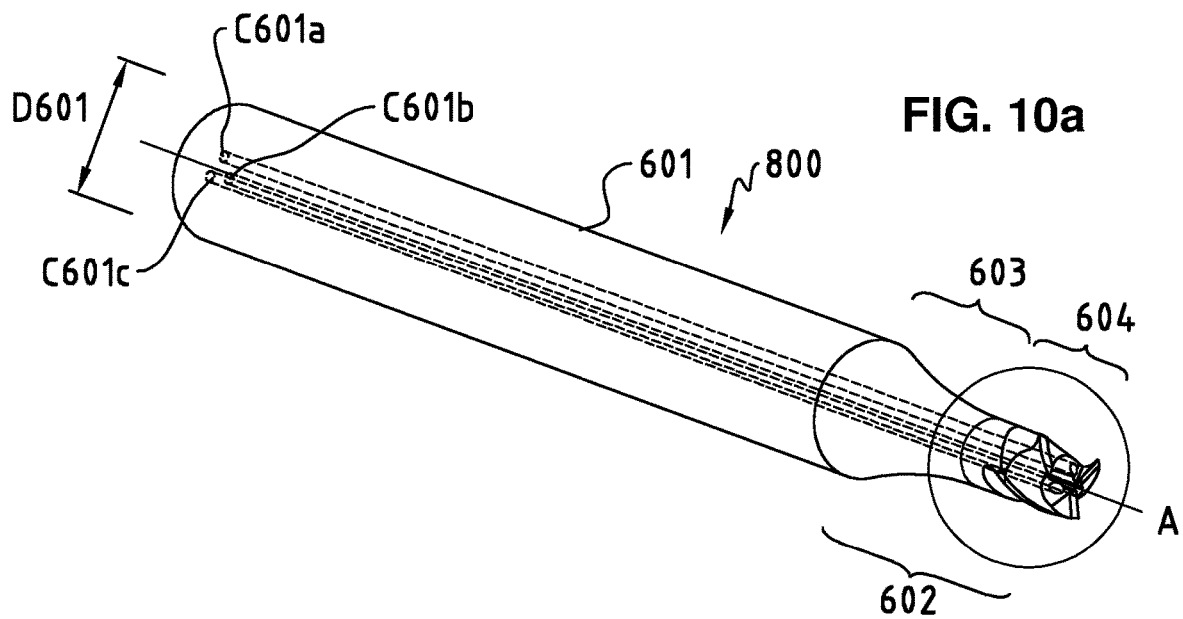
FIG. 10a represents a perspective view of a cutting tool with integrated lubrication according to a third embodiment of the second aspect of the present invention.
Figure 10B:
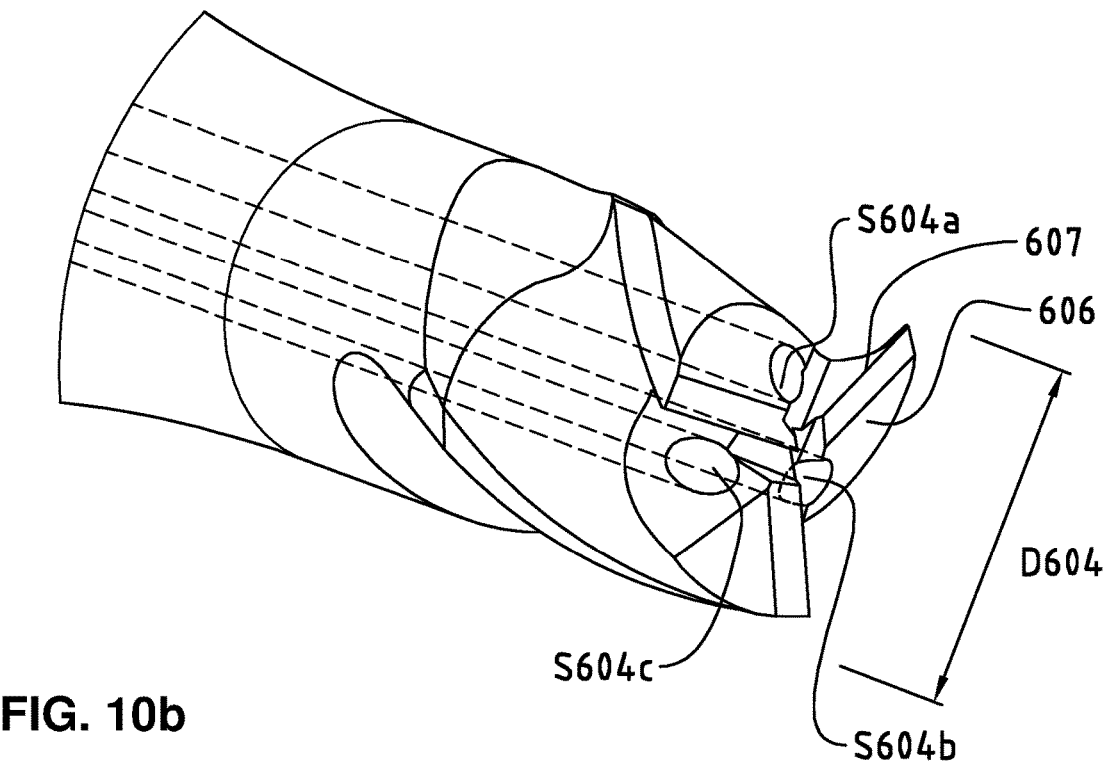
FIG. 10b represents a detailed view of the cutting portion of the cutting tool according to the third embodiment of the second aspect of the present invention.

FIGS. 10a and 10b present a cutting tool 800 with integrated lubrication according to a third embodiment of the second aspect of the present invention. Contrary to the tools 600 and 700, the tool 800 comprises lubrication ducts C601a, C601b, C601c which extend in the tool body 601 in a way substantially parallel to the central axis A. The distance between the central axis A and the lubrication ducts is preferably selected in such a way that the sprinkling holes S604a, S604b, S604c are located between the diameter cut and the front cut. More specifically, the first sprinkling hole S604a is located close to a cutting face at the diameter of the cutting portion and the second sprinkling hole S604b is located close to another cutting face at the diameter of the cutting portion 604.

This is particularly advantageous because the cutting edges of the front cut and the cutting edges of the diameter cut are lubricated. This is particularly advantageous for tools that are used in both drilling and milling mode. In addition, the fact that the lubrication channels are parallel to the central axis makes it possible to provide tools whose manufacture is much easier compared with tools 600 and 700, but still allowing sufficient lubrication.

It is important to note that in the tools 600, 700, 800 according to the second aspect of the present invention, the duct inlets on the rear face of the tool body can, for example, take the forms illustrated in FIGS. 7a to 7d. The duct inlets can have in particular a circular, oblong or curved oblong shape. Moreover the number of ducts provided passing through the tool body can be different from three. An embodiment with six ducts as illustrated in FIG. 7b is likewise possible in the second aspect of the present invention.

It is clear that the present invention is subject to numerous variations in its implementation. Although a non-limiting embodiment has been described by way of example, it is well understood that it is not conceivable to identify in an exhaustive way all the possible variations. It is of course conceivable to replace a described means with an equivalent means without departing from the scope of the present invention. All these modifications form part of the common knowledge of one skilled in the art in the field of cutting tools. In particular, one skilled in the art will understand that details described in the scope of the first aspect of the present invention can be likewise foreseen in a tool according to the second aspect of the present invention and vice-versa.

The invention claimed is:

1. A cutting tool for machining mechanical parts, comprising:
   a tool body with a central axis (A) and a gripping diameter,
   a tool head adjacent to the tool body in a direction of the central axis (A) and comprising a sprinkling region and a cutting portion having a cutting diameter which is smaller than the gripping diameter,
   at least one lubrication duct extending through the tool body and opening into a sprinkling hole located in the sprinkling region, and
   a directional sprinkling ring for attachment to a ring connection region of the tool body, the ring connection region being adjacent to the sprinkling region, the directional sprinkling ring being configured in such a way that it delimits, with at least one portion of the sprinkling region, a distribution space, wherein a cross section of a portion of the distribution space defined between a conical portion of the directional sprinkling ring and a portion of the sprinkling region having the sprinkling hole, is continuously reduced in the direction of the cutting portion.

2. The cutting tool according to claim 1, wherein the directional sprinkling ring partially covers the cutting portion.

3. The cutting tool according to claim 1, wherein the at least one lubrication duct comprises 2, 3, 4, 5, 6, 8 or 10 lubrication ducts.

4. The cutting tool according to claim 1, wherein the at least one lubrication duct extends through the tool body in parallel with the central axis (A).

5. The cutting tool according to claim 1, wherein the at least one lubrication duct extends through the tool body in a spiral around the central axis (A).

6. The cutting tool according to claim 1, wherein the directional sprinkling ring is removable.

7. The cutting tool according to claim 1, wherein the tool head is a two size milling head, having one to ten cutting teeth, the milling head having a front cutting portion and a cutting diameter.

8. The cutting tool according to claim 1, wherein the tool head is a thread whirler, a thread milling cutter, a drill, or a reamer.

9. The cutting tool according to claim 1, wherein the cutting diameter is smaller than 6 mm.

10. The cutting tool according to claim 1, wherein the tool head and the tool body are made of tungsten carbide.

11. The cutting tool according to claim 1, wherein the directional sprinkling ring is made of tungsten carbide, of metal or of synthetic material.

12. The cutting tool according to claim 1, wherein the directional sprinkling ring is fixed on the tool body by a press fit, by a thread, by a press fit with punching or by gluing.

13. The cutting tool according to claim 1, wherein the cutting diameter is smaller than 5 mm.

14. The cutting tool according to claim 1, wherein the cutting diameter is smaller than 4 mm.

\* \* \* \* \*